(No Model.)
J. T. RICE.
KNEE PAD.
No. 573,919. Patented Dec. 29, 1896.
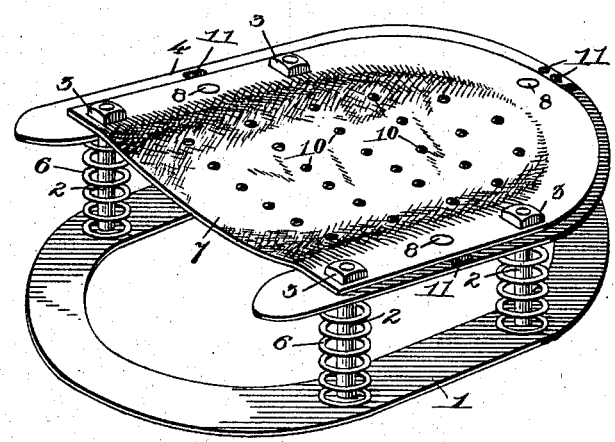
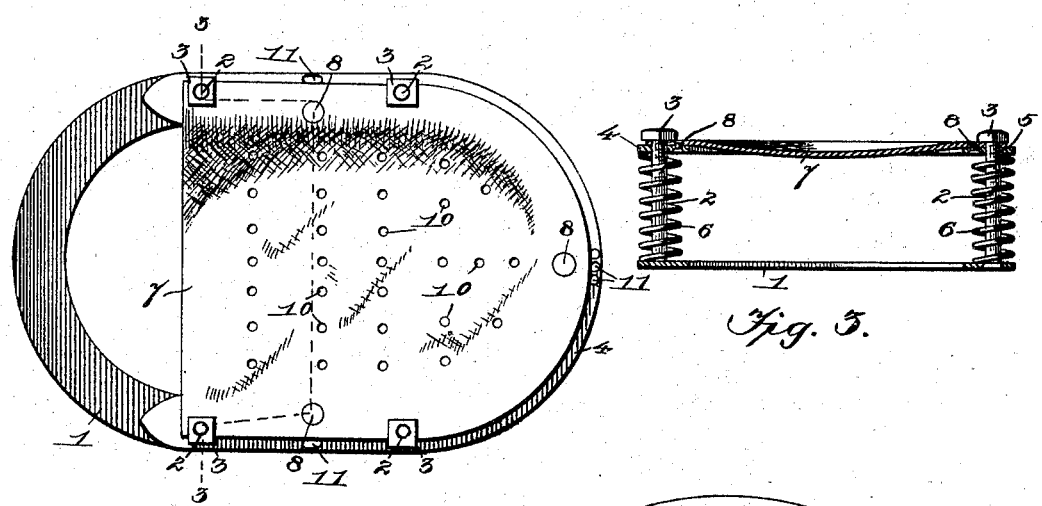
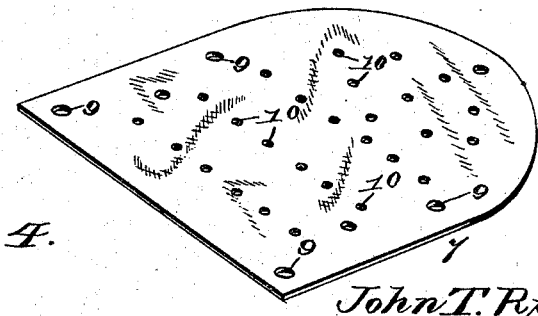
Witnesses
Inventor
John T. Rice
By his Attorneys,

UNITED STATES PATENT OFFICE.

JOHN T. RICE, OF LITTLE RIVER, TEXAS.

KNEE-PAD.

SPECIFICATION forming part of Letters Patent No. 573,919, dated December 29, 1896.

Application filed September 17, 1896. Serial No. 606,159. (No model.)

*To all whom it may concern:*

Be it known that I, JOHN T. RICE, a citizen of the United States, residing at Little River, in the county of Bell and State of Texas, have invented a new and useful Knee-Pad, of which the following is a specification.

This invention relates to improvements in knee-pads.

The object of the present invention is to provide a knee-pad which is simple, inexpensive, and durable, and which is so constructed as to hold the knee of the user in an elevated position above the ground or other surface upon which the pad may be placed, thereby preventing the knee contacting with the ground or other surface and causing injury to the knee.

The invention further contemplates a pad which shall be thoroughly ventilated, thus permitting the knee remaining cool while upon the pad, and also wherein dirt and other substances shall be prevented accumulating upon the pad and the latter always rendered clean.

With these objects in view the invention consists, substantially, in the construction, combination, and arrangement of parts, as will be hereinafter fully illustrated, described, and claimed.

In the accompanying drawings, Figure 1 is a perspective view of a knee-pad constructed in accordance with the present invention. Fig. 2 is a top plan view thereof. Fig. 3 is a transverse sectional view on the line 3 3, Fig. 2. Fig. 4 is a detail perspective view of the cushion-layer.

Similar numerals of reference designate corresponding parts throughout the figures.

Referring to the drawings, 1 designates a base-frame, which may be of any desired material adapted for the purpose, and said base-frame is preferably elliptical-shaped, but it is to be understood that any other form may be given to the same.

Rigidly secured in the base-frame 1 and extending upwardly therefrom is a series of guide-bolts 2, which guide-bolts have their upper ends screw-threaded and are arranged in opposite sides of the base-frame 1 at suitable intervals from each other, and mounted on the threaded end of each of the guide-bolts 2 is a regulating-nut 3, the purpose of which will presently appear.

Arranged above the base-frame 1 is a U-shaped supporting-frame 4, which supporting-frame may also be of any suitable material, and said supporting-frame is provided with a series of openings 5, each of which receives one of the guide-bolts 2 and permits the latter passing therethrough, thereby enabling the supporting-frame 4 to freely slide upon said guide-bolts 2.

Interposed between the supporting-frame 4 and the base-frame 1 and encircling the bolts 2 is a series of coiled springs 6, and it will be readily seen that said springs 6 exert their tension to normally force the supporting and base frames apart, said supporting-frame 4 being pressed upwardly and bearing against the under side of the regulating-nuts 3 and being retained by the latter upon the guide-bolts 2. The nuts 3 may be easily rotated upon the guide-bolts 2 by any suitable implement, and thus the tension of the coiled spring 6 may be regulated to various degrees, according to the amount of resistance to the knee it is desired to impart to the supporting-frame 4.

Arranged upon the upper surface of the open supporting-frame 4 is a layer 7, of leather or its equivalent, and said layer is designed to provide a cushion for the knee when the pad is in use and prevent the knee contacting with the surface upon which said pad is placed. It is to be noted that the layer 7 extends over the supporting-frame 4 to a sufficient extent as to be secured both at one end and the sides of said frame by rivets 8 or their equivalent, and said layer 7 is provided at its edges with openings 9, through which the upper ends of the guide-bolts 2 pass, and by reason of the supporting-frame 4 being forced upwardly and bearing against the under side of the regulating-nuts 3 the latter serve to bind the layer 7 upon said supporting-frame, and thereby assist the rivets 8 in holding said layer. When the knee is placed upon the cushion-layer 7, the former rests upon said layer, between the sides of the supporting-frame 4, and in order to thoroughly ventilate the pad, and thus permit the knee remaining cool when upon the same, the layer 7 is provided with perforations 10. The perforations 10, while serving to ventilate the layer 7, will also prevent any dirt or other substances which may fall upon the pad accumulating thereon, the dirt or other substances passing through said perforations and through the open base, and thereby rendering the pad always clean.

In order that the pad may be secured to the knee, the supporting-frame 4 has at one of its ends a series of apertures 11, and each side of said frame is also provided with a similar aperture, the purpose of said apertures 11 being to permit the attachment of fastening-straps or their equivalent to the supporting-frame 4, and thus enable the pad to be securely held to the knee.

The manner of using and the advantages of the herein-described knee-pad will be readily understood by those familiar with such devices.

The pad is especially adapted for use by cotton-pickers, but it is apparent that the same may be employed by any one desiring a pad or support for the knee, and in practice said pad is secured to the knee by means of the fastening-straps, (not illustrated,) the knee resting upon the cushion-layer 7, between the sides of the supporting-frame 4.

From the fact that the layer 7 is of leather or other equivalent material the same provides a soft surface for the knee, and by reason of the coiled springs 6 being interposed between the base and supporting frames said supporting-frame is yieldingly held above the base-frame and the knee prevented from contacting with the ground or other surface, whereby liability of injury to the knee is entirely overcome.

By forming the supporting-frame 4 in a U shape the knee may be readily placed upon the layer 7 without contact with said supporting-frame, and the entire device may be easily carried from place to place without experiencing any difficulty whatever. The nuts 3 will enable the tension of the coiled springs 6 being regulated to various degrees, so that the resistance of the supporting-frame 4 may be changed to suit different-sized persons, and said springs assist the cushion-layer 7 in providing a soft rest for the knee; and it will further be seen that the perforations 10 cool the knee when the latter is placed upon the pad and also prevent accumulation of dirt and other substances upon said pad, the dirt and other substances passing through said perforations and permitting the pad to remain clean.

From the foregoing it is obvious that I have provided a knee-pad which is simple, inexpensive, and durable; that the same is so constructed as to hold the knee of the user in an elevated position above the ground or other surface upon which the pad may be placed, thereby preventing the knee contacting with the ground or other surface and causing injury to the knee; that the pad is thoroughly ventilated, thus permitting the knee remaining cool, and, finally, that dirt and other substances shall be prevented accumulating upon the pad and the latter always rendered clean.

Having thus decribed the invention, what I claim is—

1. A knee-pad comprising a flat base, an open supporting-frame yieldingly mounted on the base and having its opening conforming to the configuration of the knee, and a pad secured to the supporting-frame, substantially as described.

2. A knee-pad comprising a flat open base, an open supporting-frame yieldingly mounted on the base, and a knee-pad secured to the supporting-frame and provided with perforations, substantially as described.

3. A knee-pad comprising a flat elliptical base, a U-shaped supporting-frame yieldingly mounted on and arranged parallel with the base, and a pad secured to the U-shaped supporting-frame, substantially as described.

4. A pad of the class described, comprising a base, guide-bolts secured in said base and extending therefrom, each of said guide-bolts having its upper end screw-threaded, a U-shaped supporting-frame disposed above the base and adapted to slide upon said guide-bolts, a cushion secured by suitable means upon the supporting-frame and adapted to prevent contact of the knee with the surface upon which the pad is placed, said cushion being provided with openings through which the guide-bolts pass to assist in retaining the cushion upon the supporting-frame, and also having perforations for ventilating the pad, coiled springs interposed between the base and the supporting-frame and encircling the guide-bolts, said coiled springs being adapted to yieldingly hold the supporting-frame above the base, and nuts mounted on the threaded ends of the guide-bolts, said nuts being adapted to regulate the tension of the coiled springs and also retain the supporting-frame upon the guide-bolts, substantially as described.

In testimony that I claim the foregoing as my own I have hereto affixed my signature in the presence of two witnesses.

JOHN T. RICE.

Witnesses:
   H. J. FORRESTER,
   J. M. BARRETT.